(No Model.)
T. A. BAILEY.
DENTAL DRILL EXTRACTOR.
No. 547,872.  Patented Oct. 15, 1895.
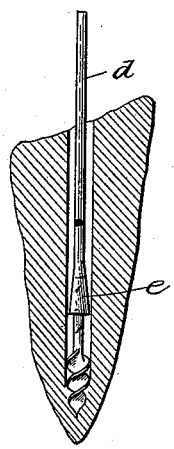
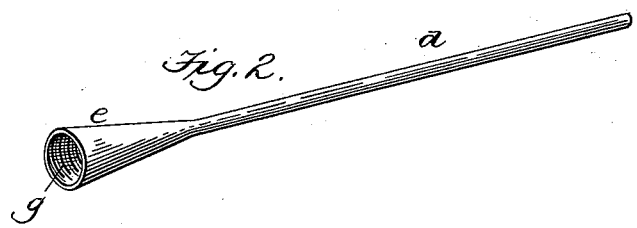
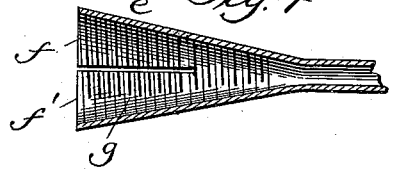
WITNESSES:
Edwin L. Bradford
Ralph Wormelle
INVENTOR
Theodore A. Bailey
BY
Patrick O'Farrell
ATTORNEY.

UNITED STATES PATENT OFFICE.

THEODORE A. BAILEY, OF WAYCROSS, GEORGIA.

DENTAL DRILL-EXTRACTOR.

SPECIFICATION forming part of Letters Patent No. 547,872, dated October 15, 1895.

Application filed January 15, 1895. Serial No. 534,942. (No model.)

*To all whom it may concern:*

Be it known that I, THEODORE A. BAILEY, a citizen of the United States of America, residing at Waycross, in the county of Ware and State of Georgia, have invented certain new and useful Improvements in Dental Drill-Extractors, of which the following is a specification, reference being had therein to the accompanying drawings.

This invention relates to dentists' drill-extractors, the object being to provide an implement which can be, upon the breaking of the shank of the dental drill, inserted into the tooth, and which will grasp the end of the broken drill, thereby enabling it to be readily removed from the tooth.

It is a well-known fact to those engaged in the art to which this invention relates that great trouble is caused by the breaking of the drill-shank, thus leaving the drill-head in the tooth.

The object of my invention is to obviate, in a great measure, the trouble caused by the said breaking of the drill-shank. I attain this object by the invention illustrated in the accompanying drawings, in which—

Figure 1 is a longitudinal sectional view of a tooth, showing a broken drill and my invention in position for extraction. Fig. 2 is a perspective view of my drill-extractor. Fig. 3 represents a dentist's drill of the usual construction. Fig. 4 is a sectional view of the extractor, showing the construction of the springing jaws.

Similar letters refer to similar parts throughout the several views.

The operation of removing the broken drill is as follows: After the drill, Fig. 3, which is of the ordinary construction, consisting of a head $a$ and a long slender shank $b$, which is provided with a driving shaft or carrier $c$, by which the implement is adapted to be connected with and rotated by a dental engine, which causes it to work its way into the tooth, I insert my extractor in the path made by the drill, and by pressing upon it and rotating it to the left it grasps hold of the end of the broken drill-head, partly by means of spring-pressure and partly by means of the screw-threads which are situated inside of the drill-extractor head.

Fig. 2 shows the general appearance of my invention, having a shank $d$ of the well-known old construction, with the gripping device $c$, as shown in Fig. 4, consisting of jaws $f$ and $f'$. Inside of the said jaws, which have a strong gripping power, are threads $g$, screwing to the left, which screw over the broken end of drill and unscrew the drill from its lodging place.

In Fig. 1 is shown the general internal shape of the gripping-head, it being larger at the end, tapering down to nothing in the direction of the shank. The opening $a$ is nearly as large as the hole in the tooth made by the drill and leaves no room from the small shank, which is broken, to pass by the side of the instrument, but compels it to enter the hole in the end $a$.

I claim—

The herein described dental drill extractor consisting of a shank having a hollow cone shaped head made of spring metal and furnished with interior female screw threads, and adapted to be forced upon the end of the broken drill, said cone shaped head being separated on one side so as to give the head an opportunity for expanding and forming jaws; said jaws having a resilient tendency thereby forming the gripping power, substantially as set forth.

In testimony whereof I affix my signature in presence of two witnesses.

THEODORE A. BAILEY.

Witnesses:
   J. L. GASKINS,
   H. C. RYALS.